United States Patent [19]

Hainsworth et al.

[11] Patent Number: 5,271,550
[45] Date of Patent: Dec. 21, 1993

[54] CHEMICAL CONVERSION PLUG TO ACHIEVE GAS TIGHTNESS

[75] Inventors: John Hainsworth, Canton; James M. Tanzosh, Silver Lake, both of Ohio

[73] Assignee: The Babcock & Wilcox Company, New Orleans, La.

[21] Appl. No.: 55,097

[22] Filed: May 3, 1993

[51] Int. Cl.⁵ .................... B23K 31/02; B23K 101/14
[52] U.S. Cl. .................................. 228/183; 228/176; 228/119; 29/890.031
[58] Field of Search ............. 228/119, 176, 183, 214; 29/890.03, 890.031, 726, 890.051

[56] References Cited

U.S. PATENT DOCUMENTS 4,924,481  5/1990  Vaughn ........................... 228/104

*Primary Examiner*—Samuel M. Heinrich
*Attorney, Agent, or Firm*—Robert J. Edwards; Michael L. Hoelter

[57] ABSTRACT

A method and apparatus for sealing the gap between adjacent boiler tubes of a panel wall thereby making the panel wall air-tight. First and second sealing members are secured to opposite sides of adjacent boiler tubes thereby defining a gap therebetween. This gap is then filled with a metal salt solution which is dried in place so as to leave a residue behind. Subsequently, this residue is further heated which converts it to a metal oxide that forms an air-tight ceramic plug. This plug possesses properties which make it resistant to deterioration once the panel wall goes into service.

14 Claims, 1 Drawing Sheet

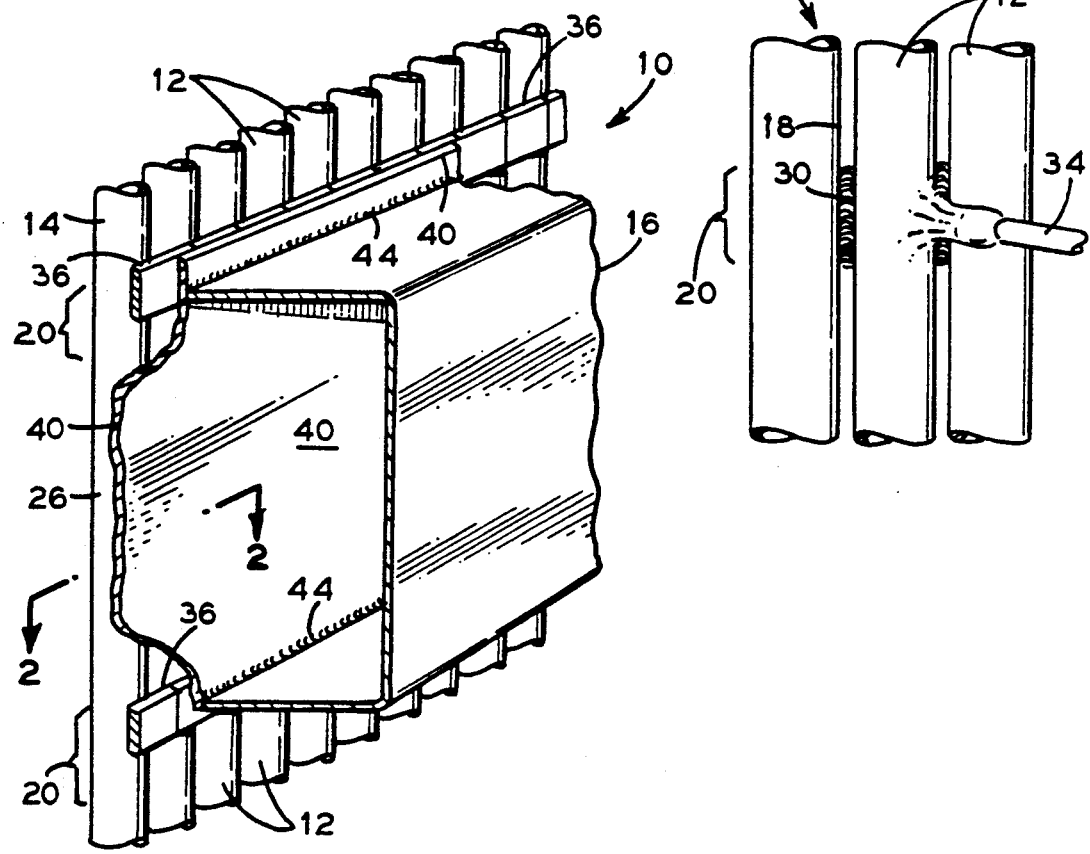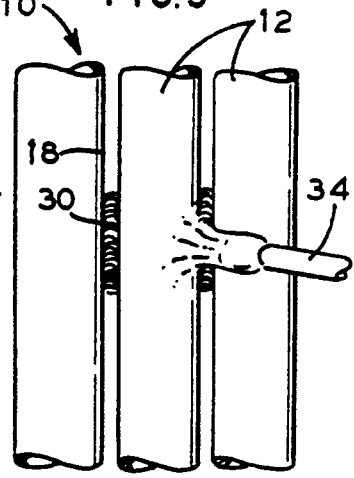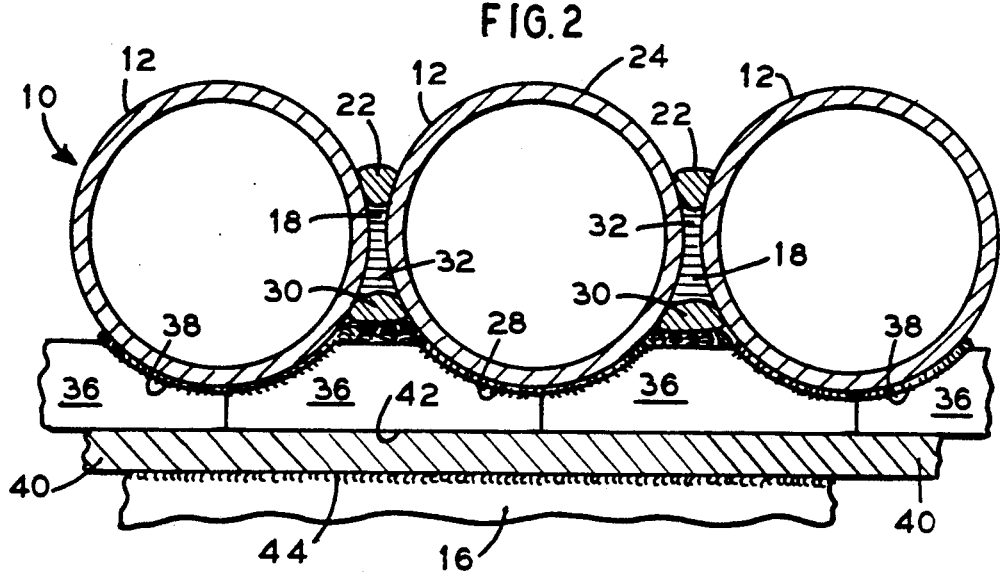

CHEMICAL CONVERSION PLUG TO ACHIEVE GAS TIGHTNESS

FIELD OF THE INVENTION

This invention pertains to boiler tube panel walls normally used to define the furnace area of a steam generating unit, and more particularly to a means of filling the area between adjacent boiler tubes in the panel wall so that the area becomes or remains air-tight.

BACKGROUND OF THE INVENTION

Boiler tube panel walls, such as those found in steam generating units, typically consist of a multitude of individual boiler tubes that are aligned and secured together. Their structural integrity enables a number of such panel walls to be interconnected and used to define the furnace enclosure of the steam generating unit.

Because of the strength and stiffness of these panel walls, it is common to hang or support other devices from the outside of the panel wall rather than provide a separate support outside the furnace enclosure for such devices. However, one caveat when doing so, is to take into account the high temperature within the furnace enclosure and the consequent expansion/contraction of the panel wall. It is also important that the device being supported by the panel wall not contribute to the corrosion of or structural damage to the individual tubes so as not to cause or increase the possibility of a rupture thereof. Another concern is the desire to maintain an air-tight envelope around the furnace with no breaks therein in order to prevent any ga leakage from occurring either into or out of the furnace enclosure or the supported device.

Currently, whenever a wind box or other pressurized enclosure is attached directly to the backside (cold or casing side) of a tangent tube panel wall, the arcuate area between adjacent tubes is oftentimes filled with a silver solder. This filler material separates the windbox from the furnace and it also insures that no break or gap will occur that would otherwise enable pressurized gas to flow between the two. Additionally, without such a filler in the arcuate area between adjacent tubes, it is possible that air would leak out of the wind box rendering it or other pressurized enclosures ineffective or non-functional for its purpose (e.g. the supply of metered combustion air).

Because silver solder is very expensive, some have tried to fill this area with weld metal instead. However, such substitution has the potential of damaging the individual boiler tubes by burning through the wall of the tube or harmfully altering the tube metallurgy. Additionally, should this gap be large, the accumulated mass of weld metal will alter the physical expansion/contraction and other properties of the adjacent tubes, thereby increasing the internal stresses and strains in the panel wall.

It is thus an object of this invention to provide an efficient and economical manner of sealing the gap between adjacent tubes of a panel wall. Another object of this invention is to provide a means whereby adjacent wind boxes or other enclosures supported by the panel walls do not leak through these gaps thereby reducing their effectiveness. Yet another object of this invention is to accomplish an air-tight seal in a non-corrosive manner such that no damage or alteration of the individual tubes will occur. Still another object of this invention is to fill this gap in such a manner that the material can withstand the high temperatures of the furnace enclosure while not affecting the efficiency of the panel walls. These and other objects and advantages will become obvious upon further investigation.

SUMMARY OF THE INVENTION

This invention pertains to a method of and apparatus for sealing the gap between adjacent boiler tubes in a boiler tube panel wall. The apparatus consists of first and second sealing members applied to adjacent boiler tubes on opposite sides of the boiler tubes. These sealing members along with the boiler tubes themselves define a gap therebetween. A metal salt solution is inserted within this gap which is then heated by local heating means to cause this solution to dry in place leaving a residue behind. Afterwards, panel wall heating means would be used to heat the entire panel wall, or at least this portion thereof, to a temperature sufficient enough to convert the dry residue to a metal oxide. This resultant metal oxide coating will plug or otherwise fill the gap while retaining properties making it resistant to deterioration once the panel wall goes into service.

BRIEF DESCRIPTION OF THE DRAWINGS

FIG. 1 is a pictorial view, partially cut away, of the attachment of a wind box or other device to a boiler tube panel wall as contemplated by this invention.

FIG. 2 is a sectional plan view taken along lines 2—2 of FIG. 1 and partially cut away, of adjacent boiler tubes of a panel wall with the gap between the tubes being filled as contemplated by this invention and with the scallop bar in place which is used to secure the wind box to the panel wall.

FIG. 3 is a pictorial view, partially cut away, of the backside of a panel wall, with the scallop bar removed, illustrating the manner of filling the gap between adjacent boiler tubes.

DETAILED DESCRIPTION OF THE DRAWINGS

Referring initially to FIG. 1, there is shown boiler tube panel wall 10 that is composed of a multitude of individual boiler tubes 12 which are aligned and secured together. Generally, a plurality of such panel walls 10 are interconnected and arranged to define the furnace enclosure 14 of a steam generating facility or unit.

As shown, furnace enclosure 14 supports vestibule or wind box 16 directly from panel wall 10. Because of such direct attachment, generally no additional supporting members need be installed within the steam generating unit. Typically, wind box 16 is configured to supply metered combustion air to furnace enclosure 14 and thus it is desirable for no leakage to occur which would reduce or diminish the effectiveness and efficiency of wind box 16. To prevent such leakage, gap 18 between adjacent boiler tubes 12 must be filled or closed in top and bottom areas 20 where wind box 16 is secured to panel wall 10. Without something to fill gap 18 between boiler tubes 12, air will leak from wind box 16 thereby rendering it ineffective or non-functional.

FIGS. 2 and 3 illustrate the manner and means whereby gap 18 in area 20 is filled. Generally, a continuous weld 22 is applied to the inside or hot side 24 of panel wall 10 in area 20. In most cases, such a weld 22 would already exist and may possible extend along the entire length of boiler tubes 12, but if not, then weld 22 would need to be applied, and especially along the hot side 24 of top and bottom areas 20. It is important that no gas be permitted to leak from wind box 16, thus, portion 26 of panel wall 10 between top and bottom areas 20 must also be sealed, if not already accomplished, by the manner disclosed herein.

Next, the back side or cold side 28 of panel wall 10 would be welded for approximately equivalent continuous lengths 30 (a "stitch" weld) thereby defining gap 18 as the open area between adjacent boiler tubes 12 and also between welds 22 and 30. A metal salt solution 32 (such as chromic and/or phosphoric acid) suspended in water would then be poured or dripped into gap 18 while gap 18 is heated such as by torch 34. Flame heating is preferred in order to dry solution 32 in place within gap 18 before it has the opportunity to run out the opposite end, but any other method of drying will suffice.

Because solution 32 is in fluid form, it is capable of flowing or seeping between welds 22 and 30 prior to drying. In this fashion, all of gap 18 can be filled with the residue from solution 32 which is dried in place by torch 34. Afterwards, the entire panel wall 10, or at least this portion thereof, is subjected to a temperature high enough to cause the dried residue from solution 32 to be converted to a metal oxide or ceramic. Preferably, such conversion is accomplished by using the heat from furnace enclosure 14, but any other method of achieving the desired temperature will suffice, including local torch heating. The resultant ceramic plug, now filling gap 18 and caused by chemical conversion under heat, is air tight and will possess properties making it resistant to deterioration once panel wall 10 goes into service.

The application of metal salt solution 32 to panel wall would only be corrosive while wet, thus, since it is dried almost immediately, the dried residue is non-corrosive. Additionally, since the conversion temperature of this dried residue to a metal oxide is low, (approximately 800 degrees F.), such heating would have no effect on the panel wall 10 which is designed to withstand much greater temperatures extremes. Furthermore, any metal salt solution 32 that can convert to an oxide which is stable at panel wall 10 operating temperatures may be used, such as the chromic and/or phosphoric acid discussed above.

Once such plug is in place, or prior to the final conversion of salt solution 32 to the ceramic or metal oxide plug, one or more scallop bars 36 are secured to cold side 28 of panel wall 10 such as by continuous weld 38 (FIG. 2). Scallop bar 36 is configured to cover the short length of continuous weld 30, or stitch weld, between adjacent boiler tubes 12. Additionally, scallop bar 36 is generally secured to both top and bottom areas 20 as shown in FIG. 1. Afterwards, it is anticipated that a flat plate 40 would be secured to the exterior flat surface 42 of scallop bars 36 thereby forming or defining one surface of wind box 16. Separate weld 44 would then be used to secure the remaining portions of wind box 16 to either flat plate 40 or flat surface 42 of scallop bar 36. Flat plate 40 aids in the reduction of any turbulence within wind box 16 because of its smooth surface as compared with the undulating, scalloped surface of the uncovered boiler tubes 12.

By this construction, combustion air is entirely contained within wind box 16 and is prevented from escaping wind box 16 such as via gap 18 since this gap 18 is now plugged. This arrangement is most useful when wind box 16 delivers combustion air to the burners since this combustion air will no longer be able to escape wind box 16 at these locations such as by getting behind plate 40 and exiting via gap 18.

What is claimed is:

1. An apparatus for sealing the gap between adjacent boiler tubes in a boiler tube panel wall comprising:
   (a) a first sealing member secured between adjacent boiler tubes on a first side of said boiler tubes;
   (b) a second sealing member secured between said adjacent boiler tubes on a second side of said boiler tubes, said first and second sealing members and said boiler tubes thereby defining a gap therebetween;
   (c) a metal salt solution inserted within said gap; and,
   (d) local heating means for heating said solution in said gap thereby causing said solution to dry in place leaving a residue behind,
   (e) whereby continued heating of the panel wall causes said residue to convert to a metal oxide or a ceramic plug.

2. The apparatus as set forth in claim 1 wherein said residue fills said gap.

3. The apparatus as set forth in claim 2 wherein said first sealing member is a continuous weld.

4. The apparatus as set forth in claim 3 wherein said second sealing member is a short length of a continuous weld.

5. The apparatus as set forth in claim 2 further comprising a scalloped bar secured to said boiler tubes, said scalloped bar covering said second sealing member.

6. The apparatus as set forth in claim 5 further comprising a wind box secured to said scalloped bar such as by welding.

7. The apparatus as set forth in claim 6 further comprising a flat plate secured to said scalloped bar and defining one side of said wind box.

8. A method of sealing the gap between adjacent boiler tubes in a boiler tube panel wall comprising the steps of:
   (a) applying a first sealing member to adjacent boiler tubes on a first side of said boiler tubes;
   (b) applying a second sealing member to said adjacent boiler tubes on a second side of said boiler tubes, said first and second sealing members and said boiler tubes thereby defining a gap therebetween;
   (c) filling said gap with a metal salt solution;
   (d) locally heating said solution to cause said solution to dry in place thereby leaving a residue; and,
   (e) heating the panel wall to a temperature sufficient enough to convert said residue to a metal oxide or a ceramic plug.

9. The method as set forth in claim 8 further comprising the step of filling said gap with said residue prior to heating the panel wall.

10. The method as set forth in claim 9 wherein the step of applying a first sealing member comprises the application of a continuous weld bonding said boiler tubes together.

11. The method as set forth in claim 10 wherein the step of applying a second sealing member comprises the application of a short length of a continuous weld bonding said boiler tubes together.

12. The method as set forth in claim 9 further comprising the step of attaching a scalloped bar to said boiler tubes which covers said second sealing member.

13. The method as set forth in claim 12 further comprising the step of securing a wind box to said scalloped bar such as by welding.

14. The method as set forth in claim 13 further comprising the step of attaching a flat plate to said scalloped bar thereby defining one side of said wind box.

* * * * *